United States Patent [19]

Takahashi

[11] 4,194,302
[45] Mar. 25, 1980

[54] ANSWER-SPOTTING ELECTRIC INSTRUMENT

[76] Inventor: Kenji Takahashi, 15-4 Oyamadai, 2-chome, Setagaya-ku, Tokyo 158, Japan

[21] Appl. No.: 951,792

[22] Filed: Oct. 16, 1978

[30] Foreign Application Priority Data

Oct. 19, 1977 [JP] Japan ............................ 52-140290

[51] Int. Cl.² ............................................. G09B 7/06
[52] U.S. Cl. ..................................................... 35/9 C
[58] Field of Search ............. 35/9 C, 9 B, 35 R, 9 R, 35/9 A

[56] References Cited

U.S. PATENT DOCUMENTS

| | | | |
|---|---|---|---|
| 2,546,666 | 3/1951 | Fleischer | 35/9 C |
| 3,141,243 | 7/1964 | Chapman et al. | 35/9 A |
| 3,177,595 | 4/1965 | Yonker et al. | 35/9 C X |
| 3,509,643 | 5/1970 | Kane | 35/9 C |
| 3,541,706 | 11/1970 | Shapiro | 35/9 C X |
| 3,774,318 | 11/1973 | Sterriti | 35/35 R |
| 3,835,553 | 9/1974 | Kirton et al. | 35/9 C |
| 4,115,931 | 9/1978 | Futhey | 35/9 C |

*Primary Examiner*—Vance Y. Hum
*Attorney, Agent, or Firm*—Blanchard, Flynn, Thiel, Boutell & Tanis

[57] ABSTRACT

An answer-spotting electric instrument which is provided with a counter so as to totalize the number of correct answers. The answer-spotting electric instrument having the counter is of the type which is provided with a pair of adjoining terminal members, an electric circuit formed between said terminal members and a signalling device connected to the electric circuit. In using the instrument, the correctness of an answer is recognized by bringing the pair of the terminal members into contact with an answer marking which is made of an electro-conductive material when the answer is correct. The counter of the answer-spotting electric instrument has a counter button to add necessary numbers one by one, a numerical indicator to display the counted number and a reset lever to return the indicated number to zero.

6 Claims, 3 Drawing Figures

ANSWER-SPOTTING ELECTRIC INSTRUMENT

BACKGROUND OF THE INVENTION

1. Field of the Invention

This invention relates to an answer-spotting electric instrument useful as a study aid. More particularly, the invention relates to an answer-spotting electric instrument which is so arranged that the correctness of the answer selected by a user for a given question or requirement can be made known at once, thereby enabling the user to directly determine the result of his study.

2. Description of the Prior Art

In one previously proposed study aid, for example, in a study book, each question section comprises two columns, one is a question column which requires a necessary answer and the other is a selectable answer column in which at least one correct answer and one or more incorrect answers are contained. Each answer is accompanied with an answer marking and the marking for a correct answer comprises an electroconductive element, while the markings for the incorrect answers comprise non-conductive elements. Both of the markings are previously printed in a manner so as not to be distinguishable from one another by the eye.

In solving questions employs a pen-type answer-spotting electric instrument and, when he points a correct answer with the instrument, a signal such as a light or sound is produced. That is, a pair of contact members of the electric circuit which is formed in the answer-spotting instrument is closed by the contact with the electro-conductive marking of a correct answer and the signalling device is energized to produce the signal.

By the use of such a study aid including the above printed matter or study book and the answer-spotting electric instrument, it is only necessary for a student to read a question section which looks like ordinary printed matter and to point an answer marking with the pen-type answer-spotting instrument. He is thus able to recognize immediately whether his answer is correct or not from the signal generated by the signal indicator. Therefore, he does not need to examine the end pages of the study book, as in the prior art, to find a correct answer from among the numerous answers provided for the various questions. Accordingly, the usefulness of the questions with selectable answers can be fully achieved in view of the objective accuracy and rapidity. Further, since the correctness of the answers can be directly ascertained, students' interests in studying can be excited.

It should be noted, however, that the conventional answer-spotting electric instruments have been of the type with which only the correctness of an answer for each question can be known. Therefore, for example, in order to check up the correct answers for 50 questions, each correct answer must be put on record and after the study, the number of correct answers must be totalized, which work may be troublesome.

SUMMARY OF THE INVENTION

It is, therefore, an object of the present invention to provide an answer-spotting electric instrument which is free from the above-mentioned disadvantage in the prior art instruments and gives the user a direct incentive to encourage his study.

Another object of the present invention is to provide an answer-spotting electric instrument which is provided with a built-in counter so as to totalize correct answers automatically without any troublesome operation.

A further object of the present invention is to provide an answer-spotting electric instrument which is simple in structure so as to be produced easily at low cost and used for a long time without trouble.

Still a further object of the present invention is to provide an answer-spotting electric instrument which is of a pen type so that it can be used with ease like an ordinary writing pen.

In accordance with the present invention, the answer-spotting electric instrument is of the type which comprises a pair of adjoining terminal members, an electric circuit that is formed between the terminal members, and a signalling device that is connected to the electric circuit to indicate the closing of the electric circuit, and the correctness or incorrectness of an answer is immediately recognized by bringing the pair of terminal members into contact with an answer marking that is made of an electro-conductive element or an insulating element. The characteristic improvement of the present invention in the above answer-spotting electric instrument is the fact that the instrument is provided with a counter which has a counter button to add necessary numbers one by one, a numerical indicator to display the added number, and a reset lever to return the indicated number to zero.

BRIEF DESCRIPTION OF THE DRAWINGS

These and other objects and features of the present invention will become more apparent from the following description taken in connection with the accompanying drawings in which.

DESCRIPTION OF THE PREFERRED EMBODIMENT

Referring now to the accompanying drawings, the embodiment of the present invention will be described in more detail.

Figure 1:
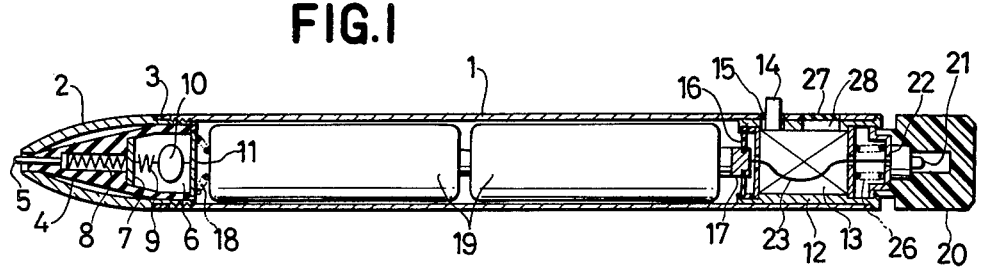
FIG. 1 is a longitudinal cross-sectional view of an embodiment of the answer-spotting electric instrument in accordance with the present invention.
Figure 2:
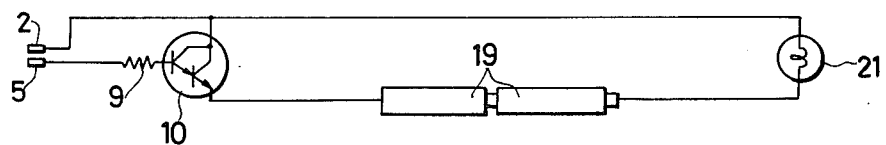
FIG. 2 is a schematic circuit diagram of the embodiment as shown in FIG. 1.

The main body 1 of the embodiment shown in FIG. 1 is made of an electro-conductive material and is formed like a tube. A tip cover 2 is releasably secured to the front end (left side in the drawing) of the main body 1 by means of a collar 3. The tip cover 2 is also made of an electro-conductive material so that it is electrically connected to the main body 1. The reference numeral 4 denotes an insulating sleeve, the front part of which slidably carries an electro-conductive probe 5. Formed in the rear part of the insulating sleeve 4 is a chamber 6 which has a metal sheet 7 on the front side wall thereof. A spring 8 is fitted in the space between the probe 5 and the metal sheet 7, so that the probe 5 is urged in the direction toward the left side of FIG. 1 and the front end thereof protrudes from the front end of the tip cover 2. When a short circuit occurs between the probe 5 and the tip cover 2, the electric circuit is closed as described below in further detail. In the chamber 6 of the insulating sleeve 4, a resistor 9 is connected in series with the base of a transistor 10. The other side of the resistor 9 is connected to the above-mentioned metal sheet 7 and the emitter of the transistor 10 is connected to a metal spring seat 11 which is attached to the rear part of the insulating sleeve 4. Further, as shown in FIG. 2, the collector of the transistor 10 is connected to the tip cover 2.

In the rear part of the main body 1, a cylinder 12 is closely fitted to the inside wall of the main body 1. The cylinder 12 is made of an electro-conductive material and it carries therein a counter 13 which has a commonly known structure. The counter button 14 of the counter 13 is protruded from an aperture 15 which is defined in the wall portion of the main body 1. To the front end of this cylinder 12 is attached an electrically insulating spacer 16 which supports a terminal piece 17 in the middle portion thereof. Two dry cells 19 are held in the main body 1 and a positive terminal of one of the dry cells is pressed to the terminal piece 17 by means of a spring 18 that is attached to the spring seat 11. In the rear part of the cylinder 12, a cap-like push button 20 is provided which is slidable in the direction of the axis of the main body 1. The push button 20 is made of a transparent or translucent material and a pilot lamp 21 is held within this push button 20. The pilot lamp 21 is electrically connected to the main body 1 on one side through a metal piece 22 which supports the lamp 21 and through the cylinder 12. The other side of the pilot lamp 21 is connected to the above-mentioned terminal piece 17 by way of a lead wire 23.

Figure 3:
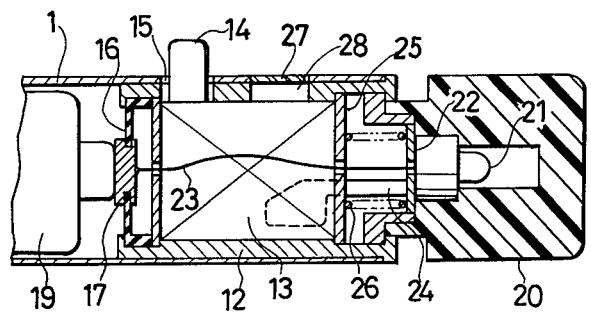
FIG. 3 is an enlarged cross-sectional view of the main portion of the embodiment of FIG. 1.

As shown clearly in FIG. 3, a clear lever 24 is attached to the push button 20 so that the counted number on the counter 13 can be returned to zero. In the space between the metal piece 22 and a spring seat 25 that is attached to the cylinder 12, a helical compression spring 26 is placed which urges the reset lever 24 and the push button 20 toward the right side. Thus, in the ordinary state, the reset lever 24 does not interrupt the working of the counter 13. The indicator of the counter 13 which shows the counted number can be read out through an opening 28 formed in the cylinder 12 and a lens 27 which is disposed on the main body 1 correspondingly to the position of the opening 28.

When a correct answer marking of a study book is pressed by the front end of the answer-spotting electric instrument having the above-described structure, the probe 5 is pushed into the insulating sleeve 4 against the force of the spring 8, thus both the probe 5 and the tip cover 2 are brought into contact with the electro-conductive correct answer marking simultaneously. Thereby, the electric circuit of dry cells—terminal piece 17—lead wire 23—pilot lamp 21—metal piece 22—cylinder 12—main body 1—tip cover 2—correct answer marking—probe 5—spring 8—metallic sheet 7—resistor 9—transistor 10—spring seat 11—spring 18—dry cells 19, is closed. Therefore, the electric current in this circuit is amplified by the transistor 10 and the pilot lamp 21 is turned on. When the pilot lamp 21 is turned on, the user presses the counter button 14 once so as to add one to the indicated number of the counter 13.

Meanwhile, when the answer-spotting electric instrument is brought into contact with an incorrect answer marking, the above-mentioned circuit is not closed since the answer marking is formed of an electrically insulating material, therefore, the pilot lamp 21 is not turned on. In this case, the counter button 14 is not pushed.

When all questions are solved in like manner as above, the indicated number of the counter 13 is read out through the lens 27. Thus the number of correct answers throughout a series of questions can be understood immediately. After that, when the indicated number is returned to zero, the reset lever 24 connected to the push button 20 is actuated by depressing the push button 20 against the force of the spring 26, which operation will be understood from the conventional art.

In the above-described embodiment, the pilot lamp 21 is employed as the signalling device of correct answers, however, it may be understood that the pilot lamp 21 can be replaced by a buzzer, the deflection of an indicator needle and other measures.

As described above, the answer-spotting electric instrument is provided with a counter according to the present invention, therefore, if the counter button is depressed every time when an user obtained a correct answer, the total number of correct answers can be immediately read out after the solving of all questions.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An answer-spotting electric instrument, comprising:

an elongated cylindrical main body having a hollow substantially conical tip cover at its forward longitudinal end porton, a longitudinal mid-portion and a rearward longitudinal end portion, said main body having an annular electrically conductive contact surface at the outer end of said tip cover, said main body having substantially the shape of a writing pen, said rearward longitudinal end portion of said body having sidewardly opening first and second apertures therethrough;

a sleeve made of electrically insulative material disposed inside said tip cover;

an elongated electrically conductive probe longitudinally slidably received in said sleeve so that said probe is electrically insulated from said main body, the outer end of said probe being extendable through the central opening of said annular contact surface and being radially spaced therefrom;

spring means for resiliently urging said probe outwardly from said main body;

battery means disposed inside said main body in said longitudinal mid-portion of said main body;

means electrically connecting one terminal of said battery means to said probe;

a number counter coaxially disposed inside said main body in said rearward longitudinal end portion thereof, said counter having a laterally movable, manually operable, actuating button projecting sidewardly through said first aperture in said main body and outwardly from said main body whereby said counter can be manually actuated to count numbers by depressing said actuating button, said counter having a counted number indicator laterally aligned with said second aperture so that the counted number can be viewed through said second aperture;

a cap-like push button longitudinally slidably mounted on the rearward longitudinal end of said main body;

electrically operated signalling means mounted in said cap-like push button, and means electrically connecting one terminal of said signalling means to said annular contact surface and means electrically connecting the other terminal of said signalling means to the other terminal of said battery means; and a reset lever attached to said cap-like push button and connected to said counter so that the counted number on the indicator of said counter is returned to zero when said cap-like push button is manually moved longitudinally relative to said main body.

2. An answer-spotting electric instrument as claimed in claim 1, wherein said push button is translucent or transparent and said signalling means is a pilot lamp located inside said push button.

3. An answer-spotting electric instrument as claimed in claim 1 or claim 2, wherein the counter actuating button is located close to said cap-like push button.

4. An answer-spotting electric instrument as claimed in claim 2 including a cylinder of electrically conductive material disposed inside the rearward longitudinal end portion of said body, said counter being disposed inside said cylinder, a plate-form spring seat inside of said cylinder and abutting against the outer end of said counter, said cap-like push button having an inner end portion slidably disposed in said cylinder and a coil spring disposed between said spring seat and said cap-like push button for urging said push button outwardly.

5. An answer-spotting electric instrument as claimed in claim 1 including a lens covering said second aperture.

6. An answer-spotting electric instrument as claimed in claim 1 including a resistor connected to said probe; and a transistor having its base connected to said resistor, its emitter electrically connected to said one terminal of said battery means and its collector electrically connected to said main body.

* * * * *